No. 640,419. Patented Jan. 2, 1900.
F. O. SCHOTT.
PROCESS OF COATING OXIDIZABLE METAL WIRE WITH GAS TIGHT COATING.
(Application filed June 28, 1899.)
(No Model.)
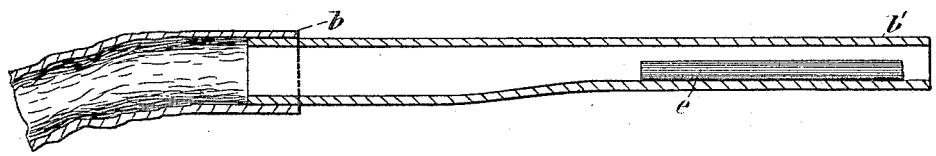
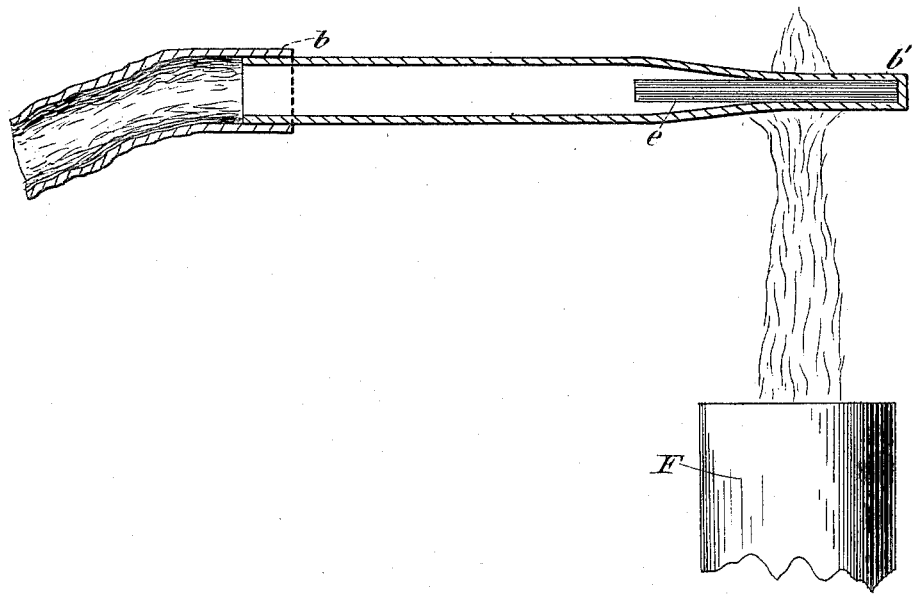
WITNESSES:
John A. Kehlenbeck.
INVENTOR
Friedrich O. Schott
BY Briesen & Knauth
ATTORNEYS.

United States Patent Office.

FRIEDRICH OTTO SCHOTT, OF JENA, GERMANY.

PROCESS OF COATING OXIDIZABLE-METAL WIRE WITH GAS-TIGHT COATING.

SPECIFICATION forming part of Letters Patent No. 640,419, dated January 2, 1900.

Application filed June 28, 1899. Serial No. 722,122. (No specimens.)

*To all whom it may concern:*

Be it known that I, FRIEDRICH OTTO SCHOTT, a subject of the Grand Duke of Saxe-Weimar-Eisenach, residing at Jena, Grand Duchy of Saxe-Weimar-Eisenach, Germany, have invented an Improved Process of Coating Oxidizable-Metal Wire with a Gas-Tight Coating, of which the following is a specification.

This invention relates to a process of coating oxidizable-metal wires with glass whereby a product is produced which can be readily fused into the stem of an incandescent lamp, thereby replacing the expensive platinum conductors ordinarily employed in such lamps. As is well known, expensive platinum wire has commonly been used to lead the electric current through the stem and the glass wall of incandescent-light bulbs, although glass having a high coefficient of expansion is known, which glass is capable of being brought into intimate union with oxidizable metals—let us say iron and nickel. The use of wires made of the cheap oxidizable metals has, however, not been achieved, as when they receive a coating of melted glass they become highly oxidized in consequence of the heat, and the connection along the oxidized layer is penetrable by gases, while at the same time the gases created upon the oxidation of the carbon and the iron containing other ingredients form under the influence of the high temperature bubbles within the surrounding glass layer and soon become the source of more serious leaks. As it seems impossible to prevent the oxidation of the iron wire when it is placed in the bulb while the material of the bulb is in a molten condition, a solution of the difficulty will be found in providing the wires with an air-tight coating, which can be easily joined by fusion with the glass of the bulb. It has been suggested to employ glass for a coating of a non-oxidizing metal—to wit, platinum—which wire is to traverse the wall of the bulb. However, the above suggestion involved the assumption that by heating the wire within a glass tube in a vacuum and by suddenly admitting air there will be created a gas-tight connection between the platinum wire and the surrounding glass tube. This is not the case, as such a process has been found to be unsuccessful in practice. It has also been proposed to surround the wire with the glass tube and to exhaust the air from the tube and subsequently heat the same to effect the union between the tube and the wire. This, however, has likewise proved to be unsuccessful in practice, for the reason that atmospheric pressure forces the walls of the glass tube in one or more long folds against the wire before the complete softening necessary for the equal contraction of the tube has taken place.

By the present invention the difficulties above mentioned are overcome and an absolutely-gas-tight glass coating on oxidizing metal wires is obtained.

The accompanying drawings are illustrative of the apparatus for carrying out the process.

In the drawings, Figure 1 is a sectional view of the apparatus, an iron wire to be coated, the same showing the position of the parts in the preliminary stage. Fig. 2 shows the same apparatus with the wire in process of being coated.

In carrying out the process the wire $e$ is surrounded by a glass tube $b'$, slightly larger than the wire and having the aforesaid high coefficient of expansion, and the air in the tube is driven out by introducing into the tube an inert or non-oxidizing gas—such as carbonic-acid gas, hydrogen, coal-gas, &c.—by means of the pipe $b$. The gas must be of such a character as not to oxidize the surface of the wire and is freely blown through the tube $b'$. The glass tube is then melted upon the wire core with the usual blowpipe F, as shown in Fig. 2.

Iron wires coated with glass according to this process show no traces of bubbles in the glass coat, are permanently gas-tight, and may be heated to any degree without oxidizing the iron core.

Having described my invention, what I claim, and desire to secure by Letters Patent, is—

1. The herein-described process of coating wires with a gas-tight coat of glass consisting in surrounding said wires with glass introducing an inert or non-oxidizing gas into the space between the wire and the glass, and thereupon melting the glass on the wire to effect fusion thereto.

2. The herein-described process of coating iron or nickel wires with glass, consisting in melting an enveloping glass coating on the wire in the presence of an envelop of inert or non-oxidizing gas preventing the access of air between the glass and the wire during the fusing operation.

FRIEDRICH OTTO SCHOTT.

Witnesses:
PAUL TEIDEMANN,
BRUNO HARTUNG.